United States Patent [19]

Andrews

[11] Patent Number: 5,092,413

[45] Date of Patent: Mar. 3, 1992

[54] METHOD AND APPARATUS FOR HIGH SPEED WEIGH FILL

[76] Inventor: James S. Andrews, 11867 Crescent Park Dr., Golden, Colo. 80403

[21] Appl. No.: 628,092

[22] Filed: Dec. 17, 1990

[51] Int. Cl.⁵ .................. G01G 13/24; G01G 19/00
[52] U.S. Cl. ............................... 177/56; 177/145
[58] Field of Search ..................... 177/59, 145, 56

[56] References Cited

U.S. PATENT DOCUMENTS

| | | |
|---|---|---|
| 784,932 | 3/1905 | Eustice . |
| 3,648,741 | 3/1972 | Croasdale . |
| 4,228,864 | 10/1980 | Berger et al. ............ 177/145 |
| 4,426,006 | 1/1984 | Horii . |
| 4,431,070 | 2/1984 | Andrews ..................... 177/102 |
| 4,562,044 | 12/1985 | Bohl ........................... 177/145 X |
| 4,605,047 | 8/1986 | Bausch . |

*Primary Examiner*—George H. Miller, Jr.
*Attorney, Agent, or Firm*—H. Kenneth Johnston, II

[57] ABSTRACT

A method and apparatus for high-speed precision powder or granular weigh filling and the like. Electronic weighing devices are used in conjunction with a multiplicity of weigh pans which can simultaneously be placed on the weighing devices, filled to a programmed weight, transported and dumped into containers all by a common mechanical system. Reject fills are flagged and are eliminated at a convenient point later on the run out conveyor.

2 Claims, 5 Drawing Sheets

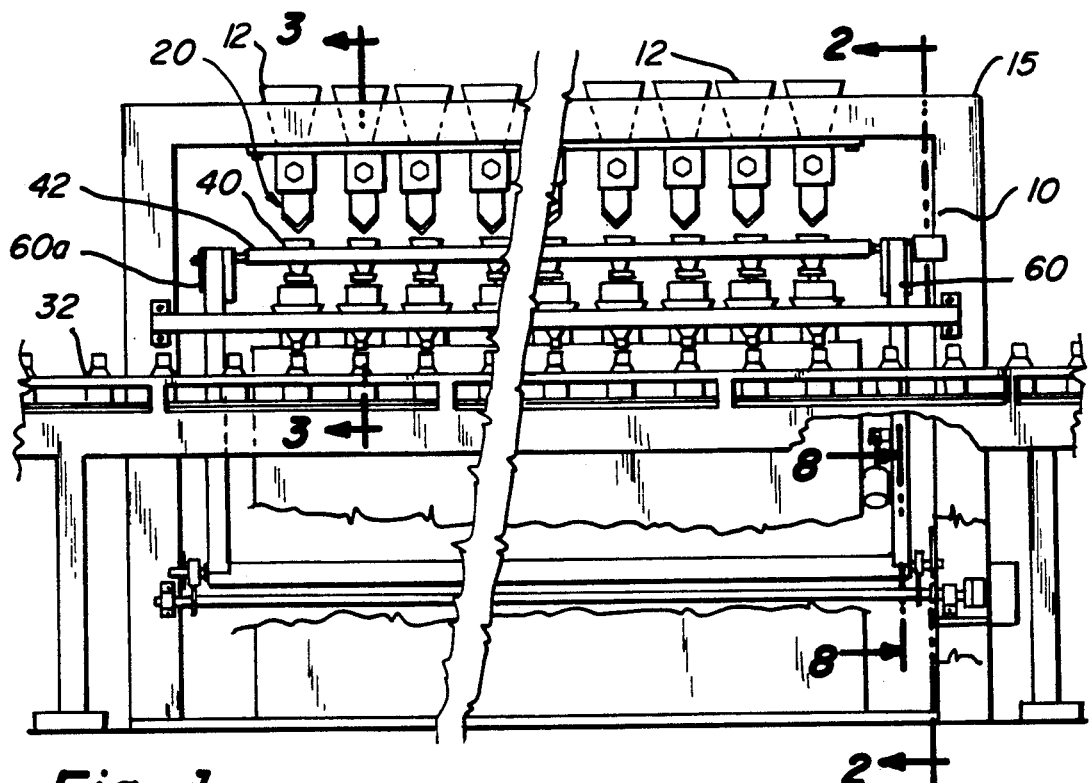
Fig_1
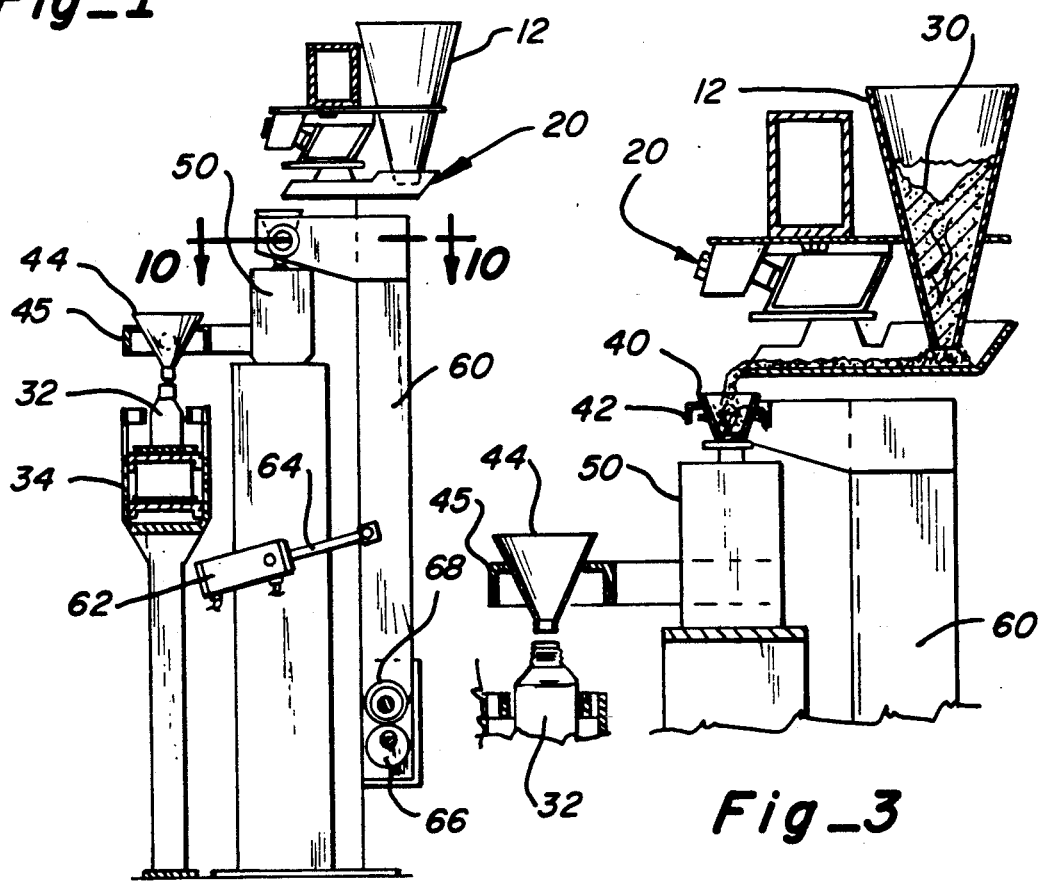
Fig_2    Fig_3

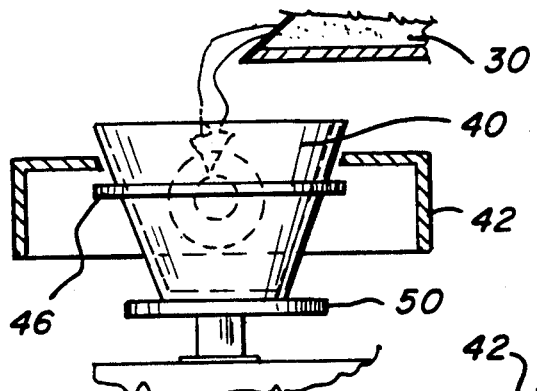
Fig_5
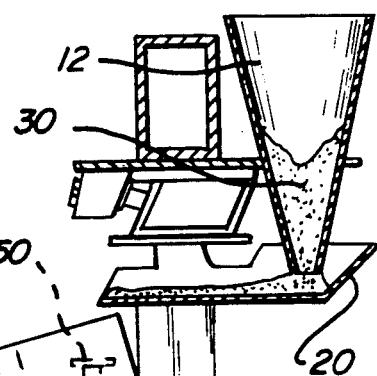
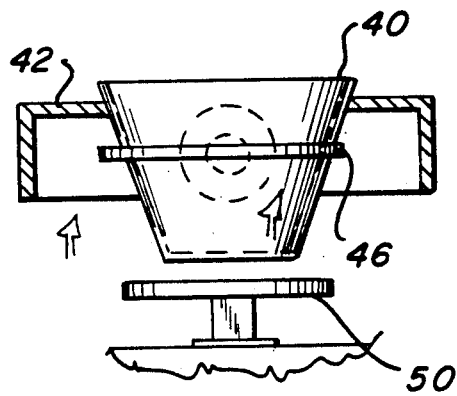
Fig_6
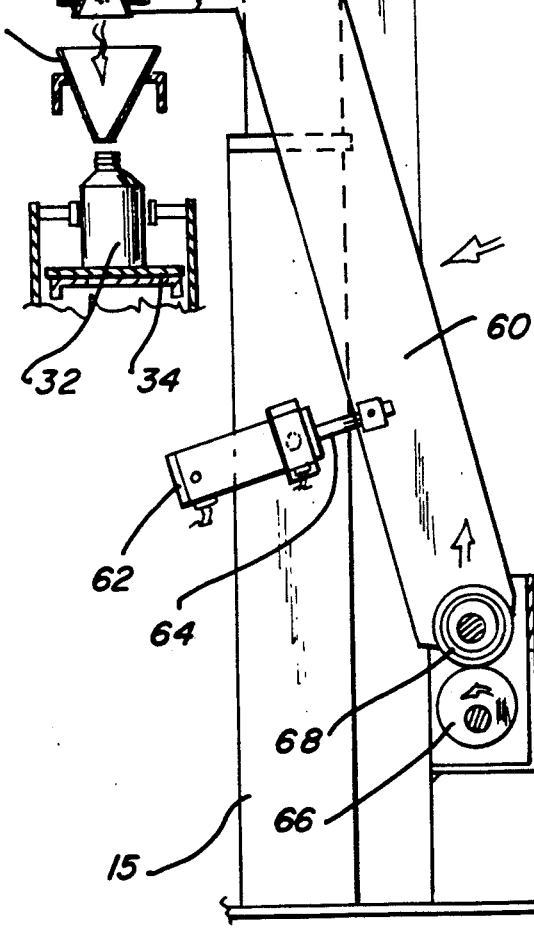
Fig_4
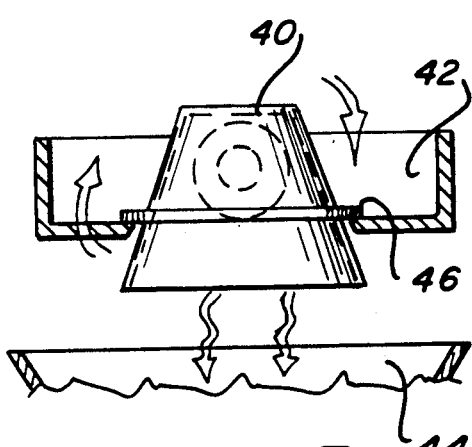
Fig_7

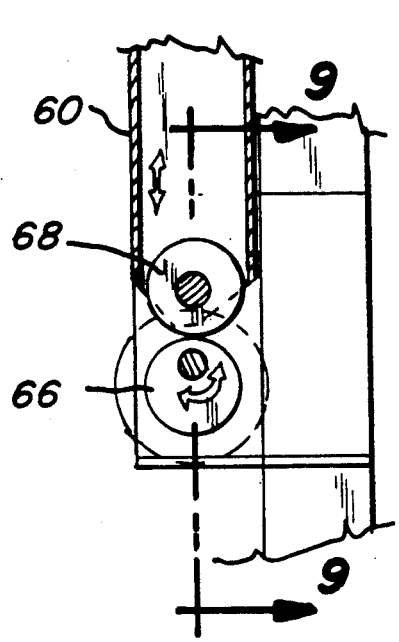
Fig_8
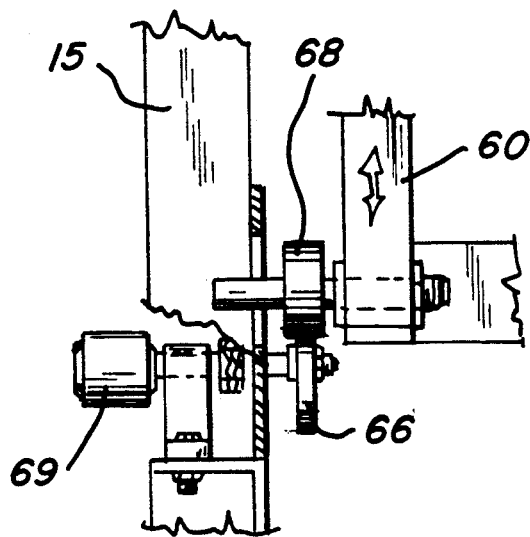
Fig_9
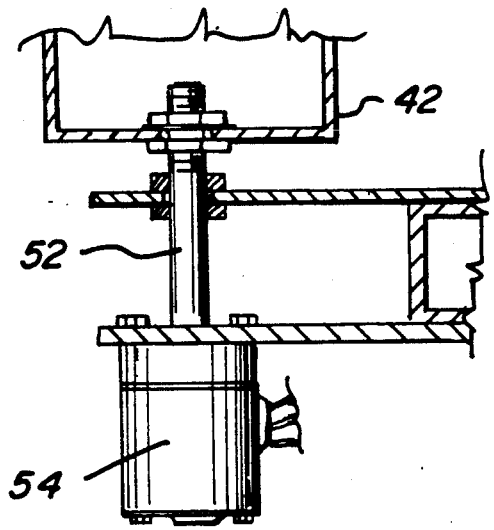
Fig_10

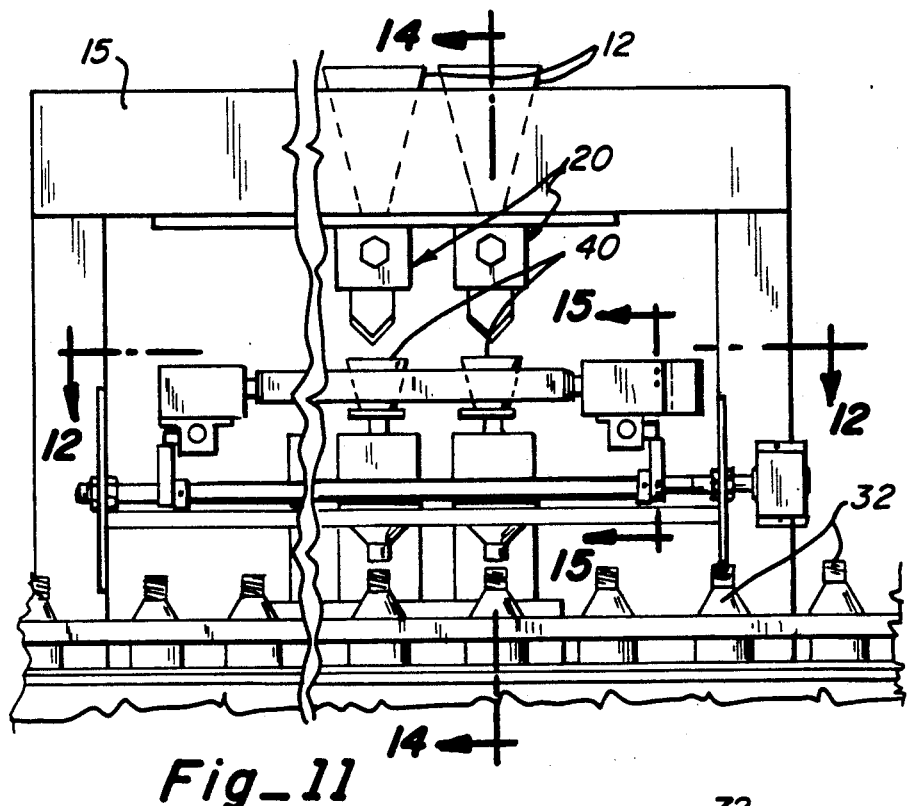
Fig_11
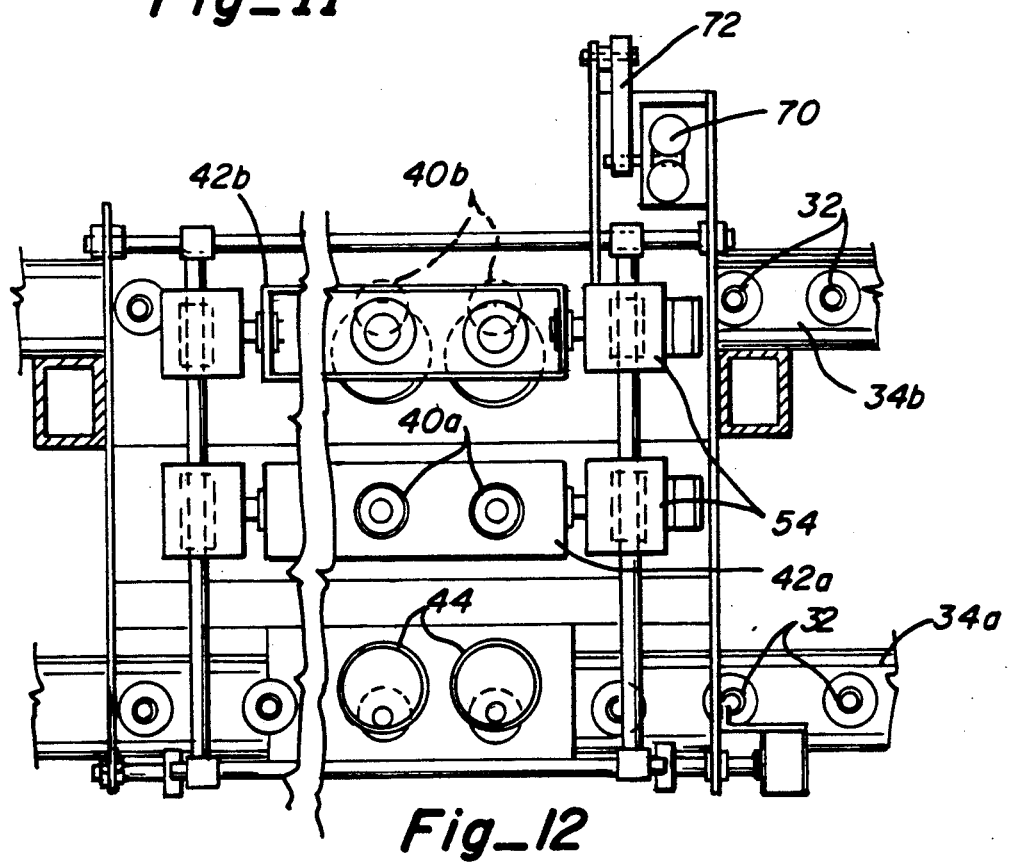
Fig_12

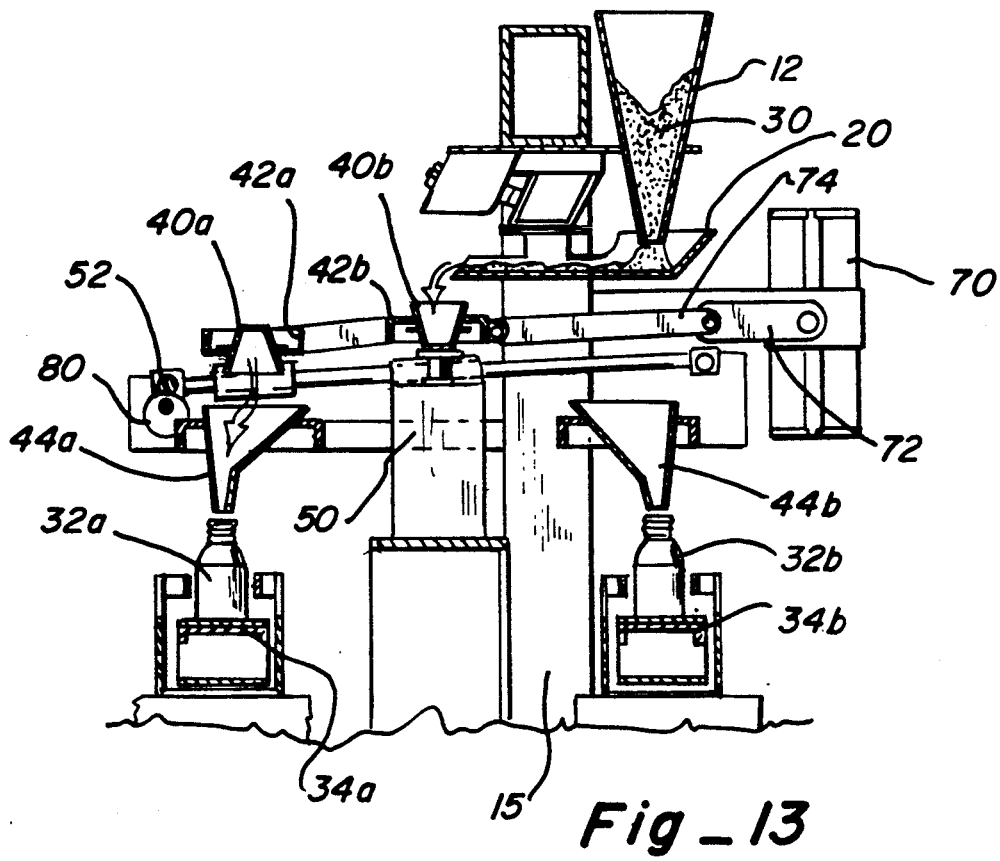
Fig_13
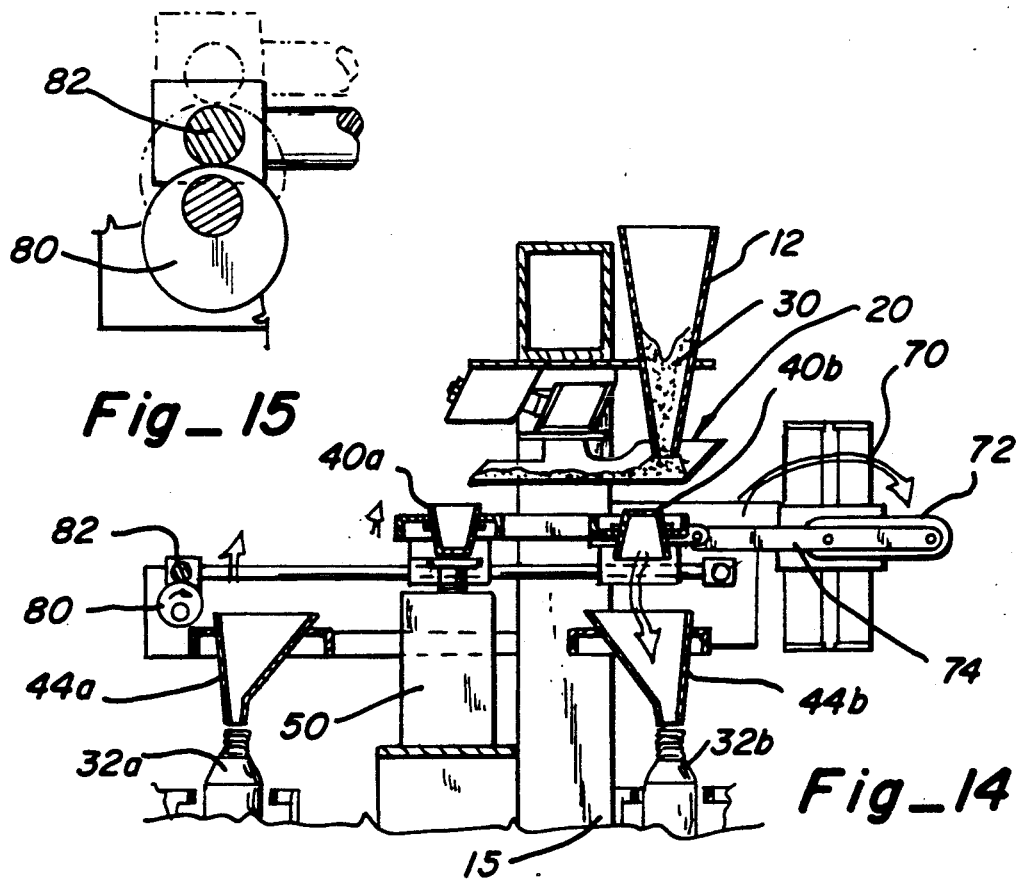
Fig_15
Fig_14

METHOD AND APPARATUS FOR HIGH SPEED WEIGH FILL

BACKGROUND OF THE INVENTION

This invention relates to a method and means for high-speed precision powder or granular weigh filling.

The requirement for the production of large quantities of precise measured amounts of chemical materials in powdered or granular form by weight has been recognized for many years. Some systems have been developed to meet this need but due to productivity limitations and design complexity they lack economic justification. Because of this, the drug industry, for instance, utilizes volumetrically controlled fill methods as a standard. One method to resolve this was developed by Andrews U.S. Pat. No. 4,431,070, however, it is a very complex system and for the most part is unable to compete favorably with volumetric fillers. Due to economic and reliability factors, existing fill by weight systems are not capable of competing against volumetric fillers except in the most demanding applications. The difficulty with requiring numerous individual units as set forth in the aforementioned Andrews patent, is the duplication of mechanical and control functions required which results in a high level of apparatus complexity with the inherent loss of reliability and relatively high capital investment. Although the aforementioned patent advanced the prior art in weigh filling it falls short in achieving the speed and reliability necessary for the high-speed precision weigh filling.

Horii, U.S. Pat. No. 4,426,006 discloses a weigh system used to sort fruits or vegetables by passing the baskets with the fruit or vegetables over a lever balance and subsequently sorting the product. This system is not feasible to be used in a powder or granular type product as it does not allow precision weights to be maintained but merely sorts the product into various weights which is totally unacceptable.

In U.S. Pat. No. 4,605,047, Bansch, et. al. discloses a filling device for bulk material, especially liquids. This method provides little or no use for bulk granular or pellet like materials.

SUMMARY OF THE INVENTION

It is the general object of the invention to provide a method and apparatus for the high-speed and precision weigh/filling of bulk materials. It is especially an object of the invention to provide the method and apparatus for the high-speed and precision weigh filling of high value and/or critical materials such as pharmaceuticals, pyrotechnic powder, granular or pelletized materials.

It is another object of this invention to provide a common mechanism for dumping large numbers of filled weigh pans simultaneously and additionally to provide a common means to advance the containers before and after being filled and allowing out-of-tolerance weigh fills being removed.

Another object of this invention is to provide a system to transport a multiplicity of weigh pans from the filled weigh position and simultaneously dumping all the weigh pans and then returning them to their original position as a weigh system with a single mechanical system.

The above and other objects, advantages and features of the present invention will become more readily appreciated and understood from a consideration of the following detailed description of a preferred embodiment of the present invention when taken together with the accompanying drawings of a preferred embodiment of the invention.

Other characteristics, advantages and objectives of this invention can be more readily appreciated from the following description and appended claims. When taken in conjunction with the accompanying drawings, this description forms a part of the specification wherein like reference and characters designate corresponding parts in several views.

BRIEF DESCRIPTION OF THE DRAWINGS

FIG. 1 is a front view partially in section of a preferred form of precision weighing and filling apparatus;

FIG. 2 is a side view of the weighing and filling apparatus taken along the line 2—2 of FIG. 1;

FIG. 3 is an enlarged view of the weighing and filling apparatus taken along the line 3—3 of FIG. 1;

FIG. 4 is a side view showing the weighing and filling apparatus in the dump mode;

FIG. 5 is an enlarged view of the weigh pan and arm of the weighing and filling apparatus in the fill and weigh mode;

FIG. 6 is an enlarged view of the weigh pan and arm of the weighing and filling apparatus in the transition mode;

FIG. 7 is an enlarged view of the weigh pan and arm of the weighing and filling apparatus in the dump mode;

FIG. 8 is a cross-sectional view of the cam of the weighing and filling apparatus taken along the line 8—8 of FIG. 1;

FIG. 9 is a cross-sectional view of the cam portion taken along the line 9—9 of FIG. 8;

FIG. 10 is a cross-sectional view of the weigh pan rotation apparatus of the weighing and filling apparatus taken along the line 10—10 of FIG. 2;

FIG. 11 is an enlarged front view partially in section of an alternate embodiment utilizing two sets of weigh pans and two container conveyors.

FIG. 12 is a top view partially in section taken along the line 12—12 of FIG. 11;

FIG. 13 is a side view of the alternate embodiment shown in FIG. 11;

FIG. 14 is a side view of the alternate embodiment shown in FIG. 11 with the shuttle mechanism shifted to the alternate position shown in FIG. 13;

FIG. 15 is a cross-sectional view of a cam mechanism for the dual weighing and filling apparatus.

DETAILED DESCRIPTION OF THE DRAWINGS

FIG. 1 shows a multi-station weigh filling system 10 supported by frame 15 on which powder or granular materials are metered through hoppers 12 and vibratory feeder 20 to waiting weigh pans 40.

The vibratory feeder 20 moves the powder or granular material 30 to the waiting weigh pan 40 which is freely resting on electronic weighing device 50 as shown in FIG.'s 2, 3 and 5.

The vibratory feeder 20 stops metering the powder or granular material 30 when electronic weighing device 50 reaches the desired fill weight. The feeder is computer controlled utilizing a feedback loop from the weighing device to optimize the filling time and accurately predict the feed cut off point to attain the desired fill weight. Both the electronic weighing device 50 and the vibratory feeder 20 may be off-the-shelf items and which are easily replaced if a malfunction occurs. During the filling process, carrier beam 42 is positioned in a manner that allows weigh pan 40 to rest on the electronic weighing device 50 without contact between the carrier beam 42 and weigh pan 40 as shown in FIG.'s 3 and 5.

During the weigh operation, container 32 is moved into place under funnel 44 by conveyor 34. Funnel 44 is held in place over container 32 by funnel support 45. During the weigh operation transfer arm 60 is in the weigh position where piston 64 and cylinder 62 are at their extended most position and transfer arm 60 has cam 66 and cam roller 68 at the lowest point as shown in FIG. 2.

Once the weigh pans 40 have been filled to a preset weight with the powder or granular material 30, the transfer arm 60 is raised by the rotation of cam 66 rotating to a position which moves cam roller 68 to its upper height raising weigh pan 40 with carrier beam 42 as shown in FIG. 6 and piston 64 and cylinder 62 retract to their retracted most position as shown in FIG. 4 moving transfer beam 60 to a position placing the weigh pan 40 over the funnel 44. Carrier beam 42 rotates 180° and the weigh pan 40 is prohibited from falling by the weigh pan retention ring 46. The powder or granular material 30 is transferred to the waiting container as shown in FIG.'s 4 and 7. Carrier beam 42 is rotated through the rotation of shaft 52 which is driven by rotary actuator 54 as shown in FIG. 10.

The transfer arm 60 is raised and lowered by a rotary actuator driving a cam 66 against cam roller 68 and driven by cam rotary actuator 69 as shown in FIG.'s 8 and 9.

FIG.'s 11 and 12 show another embodiment having a dual dispensing system in which a set of weigh pans 40 are being filled while simultaneously the other set of the weigh pans are rotated 180° to the inverted position and the powder or granular material 30 is dumped into waiting containers 32 through funnels 44.

In the dual dispensing system a powder or granular material 30 is dispensed through the vibratory feeder 20 where the weigh pan 40b is being filled while weigh pan 40a is dumped as shown in FIG. 13. In operation rotary actuator 70 rotates crank 72 as shown in FIG. 14 placing weigh pan 40a over electronic weighing device 50 for filling and weigh pan 40b is placed over its dump station. Cam 80 rotates against cam roller 82 raising and lowering the shuttle frame 74 which in the lowered state allows the weighing pan 40a or 40b to rest on electronic weighing device 50 without contact with the carrier beam 42 as shown in FIG. 5.

The weigh pans 40a and 40b are alternately filled and dumped increasing the number of filled containers 32 which may be precision filled with powder or granular materials 30. As seen with the single unit, the carrier beams 42a and 42b rotate the weigh pans 40a and 40b respectively 180° each time the shuttle frame 74 moves the weigh pans 40a and 40b so that when the weigh pan 40a is inverted and dumping, weigh pan 40b is being filled, thus reducing the cycle time. As further shown in FIG.'s 13 and 14, there are dual conveyors 34a and 34b for moving containers 32a and 32b respectively. Containers 32a and 32b are filled when weigh pans 40a and 40b are dumped into funnels 44a and 44b respectively.

The dual dispensing system provides significant increase in production with minimal increase in mechanical and control complexity. Because each of the weighed and filled weighing pans 40 were monitored by a computer when weighed on electronic weighing device 50, any fill not within the weight limits is flagged and removed from the conveyor 34 after the container 32 has been filled.

The invention and its attendant advantages will be understood from the foregoing description and it will be apparent that various changes may be made in the form, construction and arrangement of the parts of the invention without departing from the spirit and scope thereof, or sacrificing its material advantages, the arrangements hereinbefore described being merely by way of example; and I do not wish to be restricted to the specific forms or uses mentioned, except as defined in the accompanying claims.

What is claimed:

1. An apparatus for high speed precision weigh filling of containers with bulk materials comprising:
    a frame;
    a vibratory feeder means affixed to said frame for dispensing said bulk materials into a weigh pan means when said weigh pan is in a fill position;
    a balance means for weighing said bulk material dispensed into said weigh pan means when said weigh pan means is in said fill position;
    a rotatable carrier beam means capable of being independent of said weigh pan means in said fill position and capable of being in communication with said weigh pan means when in a transfer or a dump position;
    said rotatable carrier beam means rotatably affixed to a transfer arm means for transferring said rotatable carrier beam means from said fill position to said dump position;
    said rotatable carrier beam means rotating approximately 180° when in said dump position dispensing said bulk material into a container means through a funnel means;
    said weigh pan means retained in said rotatable carrier beam means by a retainer means affixed to said weigh pan means preventing said weigh pan means from falling out of said rotatable carrier beam means when in an inverted position;
    said rotatable carrier beam means rotates 180° returning said weigh pan means to said balance means and the filling and dispensing process is repeated.

2. A precision weigh filling system for dispensing granular or powder materials by weight comprising:
    three actuator means;
    a first actuator means for transporting a plurality of weigh pans from a fill position to a dump position;
    a second actuator means capable of rotating at least 180° to invert said weigh pan and to subsequently return said weigh pan to said righted position;
    a third actuator means capable of raising or lowering said first actuator means and said second actuator means for placing said weigh pans on a balance means capable of weighing said weigh pans with said powder or granular material.

* * * * *